United States Patent
Charbonneau et al.

(10) Patent No.: US 12,011,985 B2
(45) Date of Patent: Jun. 18, 2024

(54) AXLE ARRANGEMENT FOR AN ELECTRIC COMMERCIAL VEHICLE CHASSIS

(71) Applicant: Harbinger Motors Inc., Gardena, CA (US)

(72) Inventors: Alexi Charbonneau, Redondo Beach, CA (US); Phillip John Weicker, Redondo Beach, CA (US); John Henry Harris, III, Anaheim, CA (US); Daniel McCarron, Gardena, CA (US)

(73) Assignee: Harbinger Motors Inc., Gardena, CA (US)

( * ) Notice: Subject to any disclaimer, the term of this patent is extended or adjusted under 35 U.S.C. 154(b) by 0 days.

(21) Appl. No.: 18/463,123

(22) Filed: Sep. 7, 2023

(65) Prior Publication Data
US 2024/0083232 A1     Mar. 14, 2024

Related U.S. Application Data

(60) Provisional application No. 63/374,862, filed on Sep. 7, 2022, provisional application No. 63/374,873, filed on Sep. 7, 2022.

(51) Int. Cl.
| | |
|---|---|
| *B60K 1/04* | (2019.01) |
| *B60B 35/02* | (2006.01) |
| *B60G 3/00* | (2006.01) |
| *B62D 21/02* | (2006.01) |

(52) U.S. Cl.
CPC ............... *B60K 1/04* (2013.01); *B60B 35/02* (2013.01); *B60G 3/00* (2013.01); *B62D 21/02* (2013.01); *B60G 2300/02* (2013.01); *B60K 2001/0438* (2013.01)

(58) Field of Classification Search
CPC .... B60K 1/04; B60K 2001/0438; B60G 3/00; B60G 2300/02; B62D 21/02
See application file for complete search history.

(56) References Cited

U.S. PATENT DOCUMENTS

| | | |
|---|---|---|
| 2,716,461 A | 8/1955 | Macpherson |
| 3,709,516 A | 1/1973 | Ewert |
| 3,952,824 A | 4/1976 | Matschinsky |

(Continued)

FOREIGN PATENT DOCUMENTS

| | | |
|---|---|---|
| CN | 110435381 A | 11/2019 |
| CN | 210416093 A | 11/2019 |
| EP | 1839906 B1 | 9/2008 |

OTHER PUBLICATIONS

U.S. Appl. No. 18/463,117, Non Final Office Action dated Oct. 23, 2023, 10 pgs.

(Continued)

*Primary Examiner* — Jason D Shanske
*Assistant Examiner* — James J Triggs
(74) *Attorney, Agent, or Firm* — Polygon IP, LLP

(57) ABSTRACT

Described herein are methods and systems of a chassis of a commercial electric vehicle. In various embodiments, the chassis may include a ladder frame with a plurality of frame rails. Batteries and drive units may be packaged within the frame rails of the ladder frame. The chassis may further include an independent front suspension and batteries may be disposed between the suspension members of the independent front suspension.

18 Claims, 18 Drawing Sheets

(56) References Cited

U.S. PATENT DOCUMENTS

| | | | |
|---|---|---|---|
| 5,039,124 A * | 8/1991 | Widmer | B60G 11/27 267/31 |
| 5,443,130 A | 8/1995 | Tanaka et al. | |
| 10,029,551 B2 | 7/2018 | Ito et al. | |
| 10,493,835 B2 | 12/2019 | Ito et al. | |
| 10,766,478 B2 | 9/2020 | Healy et al. | |
| 10,840,488 B2 | 11/2020 | Izumi et al. | |
| 11,161,402 B2 | 11/2021 | McCarron et al. | |
| 11,376,970 B2 | 7/2022 | Yu | |
| 11,414,134 B2 | 8/2022 | Timofeev et al. | |
| 2003/0205880 A1* | 11/2003 | Walker | B60G 3/20 280/124.135 |
| 2005/0077137 A1 | 4/2005 | Nozaki et al. | |
| 2020/0247224 A1* | 8/2020 | Ito | B60K 17/04 |
| 2020/0346506 A1 | 11/2020 | Laforce et al. | |
| 2020/0369140 A1* | 11/2020 | McCarron | B60G 15/067 |
| 2021/0218101 A1* | 7/2021 | Menon | B60L 9/18 |
| 2022/0032704 A1 | 2/2022 | Desourdy et al. | |
| 2022/0144032 A1 | 5/2022 | Brooks et al. | |
| 2022/0194489 A1 | 6/2022 | Roche et al. | |
| 2022/0289012 A1 | 9/2022 | Kamimae | |
| 2022/0410990 A1 | 12/2022 | Rust | |

OTHER PUBLICATIONS

International Application Serial No. PCT/US23/73638, Search Report and Written Opinion dated Jan. 2, 2024, 13 pgs.
Wikipedia, "Constant Velocity Joint", 6 pages, retrieved Oct. 18, 2023. [https://en.wikipedia.org/wiki/Constant-velocityjoint] (Year: 2023).

* cited by examiner

AXLE ARRANGEMENT FOR AN ELECTRIC COMMERCIAL VEHICLE CHASSIS

CROSS-REFERENCE TO RELATED APPLICATION

This application claims the benefit under 35 U.S.C. § 119(e) of U.S. Provisional Patent Application No. 63/374,862, entitled "Electric Commercial Vehicle Rear Axle" and filed on 2022 Sep. 7, and of U.S. Provisional Patent Application 63/374,873, entitled "Electric Commercial Vehicle Chassis" and filed on 2022 Sep. 7, both of which are incorporated herein by reference in their entireties for all purposes.

BACKGROUND

Commercial vehicles typically transmit power from a front mounted powerplant via torque tube, Hotchkiss drive, or other driveshaft based configurations. Such a configuration disposes a driveshaft between the frame rails of a ladder frame of the vehicle, preventing the space from being utilized to package other components.

Furthermore, commercial vehicles typically utilize live axle suspension configurations. Live axle suspension configurations allow for high loads to be carried by commercial vehicles and allow for the integration of drive shafts within the axle. However, live axle suspension configurations require certain packaging features. While such features are not a problem and, in fact, may be advantageous on internal combustion engine (ICE) commercial vehicle, they can be problematic for packaging in electric commercial vehicles.

SUMMARY

Described herein are chassis configurations for electric commercial vehicles. In some examples, an electric commercial vehicle comprises a ladder frame, an electric motor, a drivetrain, a battery, a CV axle, and a rear suspension. The ladder frame comprising a plurality of frame rails; an electric motor, disposed between at least two of the frame rails and mounted to the ladder frame. The drivetrain, coupled to the electric motor and configured to transmit motive force from the electric motor. The battery, comprising one or more battery packs configured to provide electrical power to the electric motor, each battery pack disposed between at least two of the frame rails. The CV axle, configured to transmit motive force from the drivetrain to a wheel of the electric commercial vehicle. The rear suspension comprising a beam axle, the rear suspension coupled to the CV axle.

These and other embodiments are described further below with reference to the figures.

CLAUSES

Clause 1. An electric commercial vehicle comprising: a ladder frame comprising a plurality of frame rails; an electric motor, disposed between at least two of the frame rails and mounted to the ladder frame; a drivetrain, coupled to the electric motor and configured to transmit motive force from the electric motor; a battery, comprising one or more battery packs configured to provide electrical power to the electric motor, each battery pack disposed between at least two of the frame rails; a CV axle, configured to transmit motive force from the drivetrain to a wheel of the electric commercial vehicle; and a rear suspension comprising a beam axle, the rear suspension coupled to the CV axle.

Clause 2. The electric commercial vehicle of clause 1, wherein the beam axle is a dead axle.

Clause 3. The electric commercial vehicle of clause 2, wherein the beam axle is a de Dion axle.

Clause 4. The electric commercial vehicle of clause 3, further comprising: a hub assembly, coupled to an end of the beam axle and comprising a hub, the hub configured to receive the wheel and configured to rotate around a hub centerline.

Clause 5. The electric commercial vehicle of clause 4, wherein a center portion of the de Dion axle is disposed rearward and downward of the hub centerline.

Clause 6. The electric commercial vehicle of clause 4, wherein the hub centerline intersects at least a portion of the drivetrain.

Clause 7. The electric commercial vehicle of clause 2, wherein the beam axle comprises a CV cup configured to receive a portion of the CV axle.

Clause 8. The electric commercial vehicle of clause 1, wherein the drivetrain is a transaxle.

Clause 9. The electric commercial vehicle of clause 1, wherein the rear suspension is disposed within a rear suspension area of the ladder frame, and wherein the plurality of frame rails is notched within the rear suspension area.

Clause 10. The electric commercial vehicle of clause 9, wherein the notching prevents contact between the plurality of frame rails and the beam axle.

Clause 11. The electric commercial vehicle of clause 9, wherein each of the plurality of frame rails is strengthened within the rear suspension area.

Clause 12. The electric commercial vehicle of clause 11, wherein the strengthening comprises one or more of an increase in a thickness of material, multiple layers of material, and/or strength increasing forms.

Clause 13. The electric commercial vehicle of clause 1, further comprising: an independent front suspension.

Clause 14. The electric commercial vehicle of clause 13, wherein the front suspension is disposed proximate a front suspension area of the ladder frame, and wherein a bottom of the ladder frame within the front suspension area is colinear with other portions of the frame rail.

Clause 15. The electric commercial vehicle of clause 14, wherein at least one battery pack is at least partially disposed between the at least two of the frame rails within the front suspension area.

Clause 16. The electric commercial vehicle of clause 14, wherein a plurality of battery packs are at least partially disposed between the at least two of the frame rails within the front suspension area.

Clause 17. The electric commercial vehicle of clause 16, wherein at least two of the plurality of battery packs are stacked atop each other.

Clause 18. The electric commercial vehicle of clause 13, wherein a front axle centerline of the independent front suspension passes through a portion of the frame rails.

Clause 19. The electric commercial vehicle of clause 1, wherein the drivetrain is mounted to the ladder frame.

Clause 20. The electric commercial vehicle of clause 1, further comprising: the wheel.

DETAILED DESCRIPTION

Figure 1:
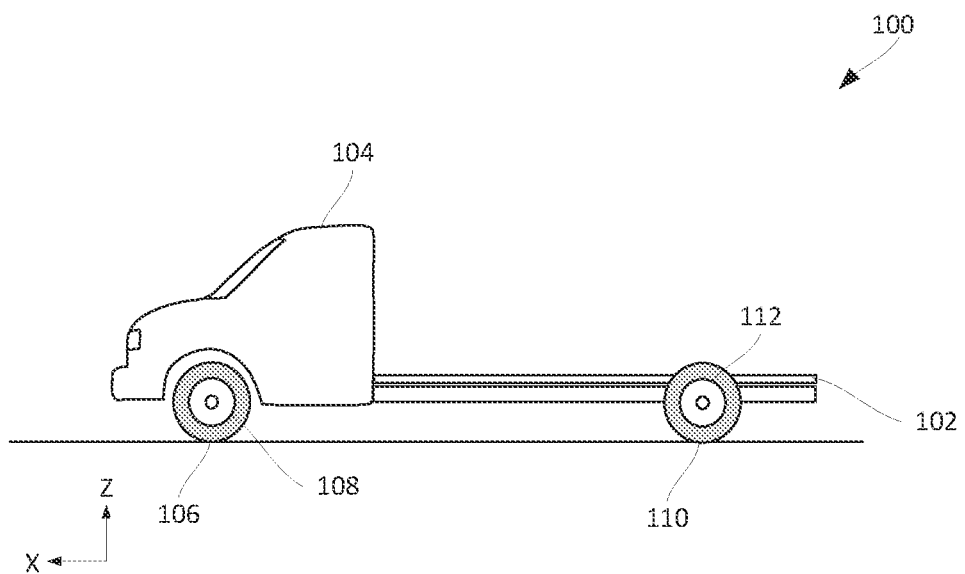
FIG. 1 illustrates a vehicle, in accordance with certain embodiments.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

It is appreciated that, for the purposes of this disclosure, when an element includes a plurality of similar elements distinguished by a letter following the ordinal indicator (e.g., "236A" and "236B") and reference is made to only the ordinal indicator itself (e.g., "236"), such a reference is applicable to all the similar elements.

INTRODUCTION

Typically, commercial vehicles utilize live axle rear suspension and transmit power from a front mounted powerplant via torque tube, Hotchkiss drive, or other driveshaft based configurations. Live axle rear suspension allows for a large load carrying capacity while being able to package the rear suspension axles and power-transmitting axles in a compact package, such as between the frame rails of the ladder frame of the commercial vehicle. Such a configuration disposes a driveshaft between the frame rails of a ladder frame of the vehicle, preventing the space from being utilized to package certain other components, but still allows enough space for equipment typical of an internal combustion engine (ICE) vehicle, such as exhausts and brake lines.

However, electric commercial vehicles have different packaging challenges compared to ICE commercial vehicles. For an electric commercial vehicle, such a configuration prevents packaging of batteries within the frame rails of the vehicle and, thus, requires batteries to be packaged in other locations, decreasing the amount of available space for carrying cargo, people, and/or packaging other components.

Certain concepts may dispose of electric motors or drive units on the powered axles of electric vehicles. Disposing electric motors or drive units on an axle of the vehicle may result in the electric motor or drive unit experiencing unacceptably high levels of bumps and vibration, increasing the likelihood of failure and decreasing reliability. The bulk of electric motors or drive units that are attached to the live axle also limit ground clearance and increase bulk around the axle. Therefore, typical live axle rear suspension for electric commercial vehicles introduces reliability and/or packaging disadvantages.

The systems and techniques described herein allow for a commercial electric vehicle architecture that disposes the electric motor between the frame rails of the ladder frame without the need for a driveshaft or other power transmission component that transfers power from the front of the vehicle to the rear of the vehicle. Thus, batteries may be disposed between the frame rails of the ladder frame as well. Packaging of the commercial electric vehicle may thus be improved. Such packaging may be combined with a dead axle rear suspension configuration that couples the electric motors or drive units to the frame, while allowing for the load carrying capabilities of a solid axle rear suspension. Furthermore, additional features may be disclosed based on the configuration of the chassis.

Vehicle Examples

FIG. 1 illustrates a vehicle, in accordance with certain embodiments. FIG. 1 illustrates vehicle 100 that includes chassis 102, cab 104, front tire 106, front wheel 108, rear tire 110, and rear wheel 112. In certain embodiments, vehicle 100 may be a commercial vehicle with electric propulsion. The front of vehicle 100 may be defined as the forward end (e.g., the end of vehicle 100 that is closer to front wheel 108 than rear wheel 112) and the rear of vehicle 100 may be defined as the rearward end (e.g., the end of vehicle 100 that is closer to rear wheel 112 than front wheel 108).

Vehicle 100 may represent any type of commercial vehicle, such as a vehicle with an integrated cargo volume, (e.g., a delivery van or a box truck), a flatbed truck, a pickup truck, a truck with an enclosed cargo box, a towing vehicle, and/or any other such commercial vehicle. Chassis 102 may be any type of appropriate chassis, such as a ladder frame, unibody, monocoque, semi-monocoque, and/or other such type of chassis that may allow for vehicle 100 to provide load-carrying and/or towing ability. Though not illustrated in FIG. 1, vehicle 100 may additionally include one or more of a flatbed, truck bed, cargo container, cabin, and/or other compartment for carrying loads and/or performing tasks. In certain embodiments, vehicle 100 may be powered by one or more electric drive units (e.g., electric motors and drivetrains for the electric motors) that are mounted in various portions of vehicle 100. For example, vehicle 100 may mount one or more electric motors in front of tire 110 and wheel 112, within the frame rails of 102, and/or within another portion of vehicle 100.

Chassis Examples

Figure 2:
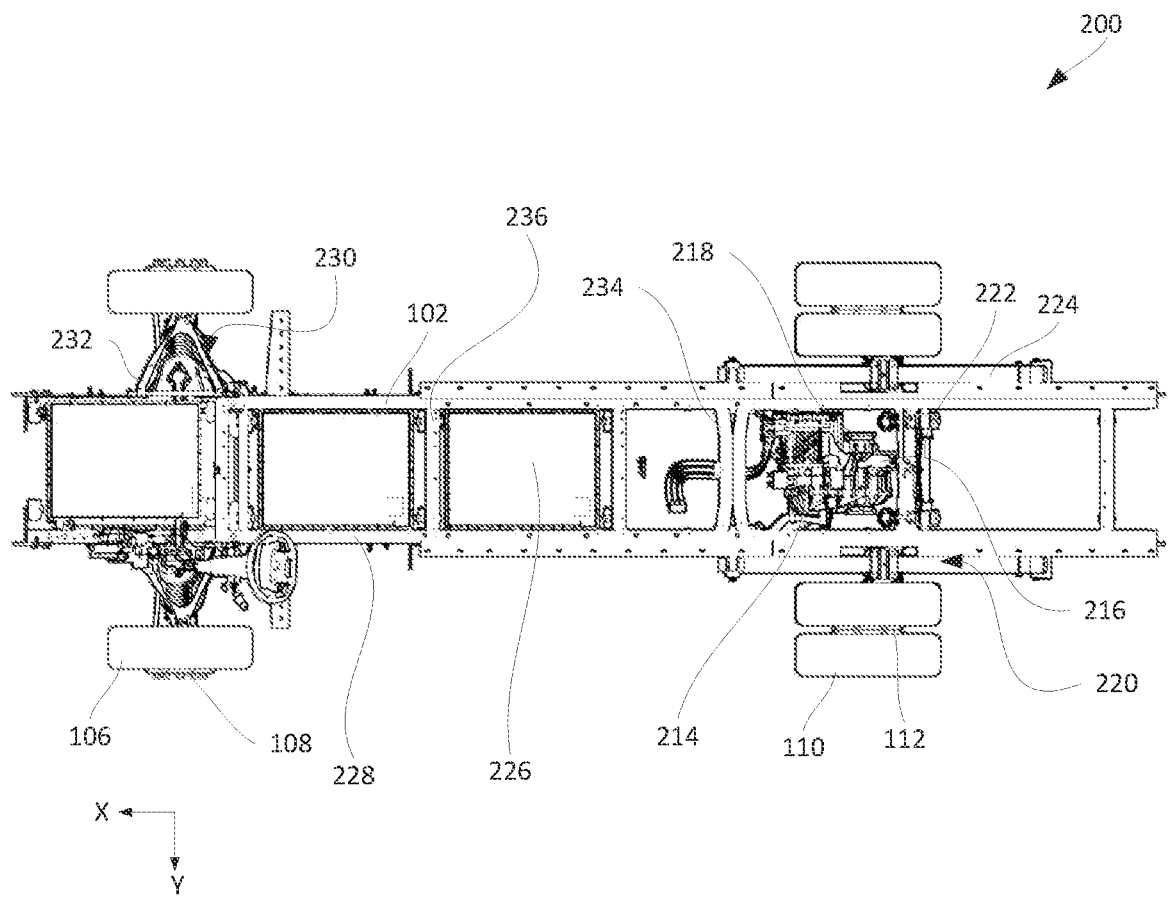
FIG. 2 is a top view of an electric commercial vehicle chassis, in accordance with certain embodiments.

FIG. 2 is a top view of an electric commercial vehicle chassis, in accordance with certain embodiments. FIG. 2 illustrates vehicle architecture 200 which includes chassis 102, front tire 106, front wheel 108, rear tire 110, rear wheel 112, electric motor 214, drivetrain 216, CV axle 218, rear suspension 220, battery 226, and front suspension 230. Chassis 102 includes frame rails 228, crossmembers 234, and crossmembers 236. Rear suspension 220 includes de Dion axle 222 and leaf spring 224. Front suspension 230 includes control arm 232. Drivetrain 216 is coupled to electric motor 214 and configured to output power produced by electric motor 214 to rear wheel 112 via CV axle 218. Drivetrain 216 and electric motor 214 may form an electric drive unit.

In various embodiments, electric motor 214 may be any type of electrified (e.g., pure electric or hybrid) drive unit that is configured to power and provide at least partially electrified propulsion to vehicle 100 (which vehicle architecture 200 may be a portion thereof). Thus, electric motor 214 may be, for example, any type of direct current (DC) or alternating current (AC) electric motor that may provide motive force. The motive force may be transmitted via drivetrain 216, which may be a direct drive, a gear reduction, and/or a multi-speed transmission or transaxle. Drivetrain 216 may include an output shaft or cavity that may be configured to receive a portion of CV axle 218 and provide motive force to CV axle 218.

As shown in FIG. 2, electric motor 214 and/or drivetrain 216 may be disposed proximate to rear wheel 112. As shown in FIG. 2, electric motor 214 and drivetrain 216 is disposed in front of de Dion axle 222. CV axle 218 may transmit motive force from drivetrain 216 to rear wheel 112. Such a configuration may not include a propshaft or other driveshaft that couples electric motor 214 and/or drivetrain 216 with CV axle 218. Instead, drivetrain 216 may be a transaxle and CV axle 218 may transit motive force in the lateral (y) direction, while no driveshafts are oriented in the longitudinal (x) direction.

CV axle 218 allows for motive force to be transmitted from drivetrain 216 to rear wheel 112 while there is a degree of misalignment between drivetrain 216 and rear wheel 112 (e.g., the CV cups of CV axle 218 may operate at a misalignment angle). CV axle 218 allows for electric motor 214 and drivetrain 216 to be mounted to chassis 102 without the use of a Hotchkiss drive to transmit torque to rear tire 110. Otherwise, such a Hotchkiss drive may take up space between frame rails 228 of chassis 102 and result in parasitic losses and, thus, decrease efficiency. Furthermore, disposing of electric motor 214 and/or drivetrain 216 on an axle (e.g., live axle) of vehicle architecture 200 may subject electric motor 214 and/or drivetrain 216 to unacceptably high levels of bumps and vibration, increasing the likelihood of failure and decreasing reliability. For vehicle architecture 200, electric motor 214 and drivetrain 216 are mounted to chassis 102 (instead of to rear suspension 220) to improve reliability and isolate electric motor 214 and drivetrain 216 from shocks from, for example, bumps and other operating shocks and vibrations and, thus, avoid the disadvantages of mounting electric motor 214 and/or drivetrain 216 to a live axle.

CV axle 218 allows for electric motor 214 and drivetrain 216 to be disposed on chassis 102 while powering rear wheel 112. CV axles typically operate most reliably when the misalignment angle is as low as possible. CV axles are also generally utilized in independent suspension arrangements, which do not have the load carrying capacity of a beam axle (e.g., live or dead axle) type suspension. For vehicle architecture 200, rear suspension 220 includes de Dion axle 222. De Dion axle 222 may be curved in one or more axes to allow for electric motor 214 and/or drivetrain 216 to be disposed close to the axle centerline (e.g., the axle centerline of the rear wheels may intersect at least a portion of electric motor 214 and/or drivetrain 216) to minimize the misalignment angle of CV axle 218. Such a configuration may allow for the load carrying capacity of a beam axle while avoiding the need for a central propshaft to transfer propulsive force by disposing electric motor 214 and/or drivetrain 216 proximate to rear wheel 112 in a transaxle configuration. The elimination of the central propshaft provides space for packaging, such as space for batteries to be disposed between the frame rails 228 of chassis 102.

Battery 226 may provide electrical power to electric motor 214. Thus, battery 226 may store electrical charge that may be communicated to electric motor 214 and power electric motor 214 such that electric motor 214 generates rotational force. Battery 226 may include one or a plurality of battery packs that may each include one or a plurality of battery modules. Battery 226 may be any type of battery appropriate for powering an electrified vehicle, such as nickel metal hydride, lithium ion, lithium iron phosphate, and/or other such types of batteries.

Due to the location of electric motor 214 and drivetrain 216 of vehicle architecture 200, various packs of battery 226 may be disposed within frame rails 228 of chassis 102. In a typical configuration with a driveshaft such as a Hotchkiss drive, the driveshaft would be disposed within the space between frame rails 228, preventing one or more packs of battery 226 from being disposed within frame rails 228. In various embodiments, packs of battery 226 may be disposed both in front of (e.g., towards the front of the vehicle) and behind (e.g., towards the rear of the vehicle) electric motor 214 and/or drivetrain 216. Additionally, one or more packs of battery 226 may be disposed between portions of front suspension 230.

Vehicle architecture 200 further increases the benefits of such packaging arrangements by disposing battery 226, electric motor 214, and drivetrain 216 within the frame rails of chassis 102. Accordingly, all or the majority of the main motive components of vehicle architecture 200 may be disposed between the frame rails of chassis 102, providing protection for such elements.

A typical commercial vehicle utilizes a beam axle front suspension. The beam axle front suspension requires that the floor of the frame of the vehicle be elevated, in order to provide space for movement of the beam axle (e.g., due to bumps, roll, and/or other suspension movement). The elevated floor renders the space above the front suspension unsuitable for battery packaging or at least would lead to an undesirable increase in center of gravity height if batteries were disposed in that location, as well as decreasing crash protection and resulting in various other undesirable vehicle characteristics.

Front suspension 230 of vehicle architecture 200 utilizes independent front suspension that includes one or more control arm 232. In certain embodiments, front suspension 230 may be a double wishbone or control arm suspension that includes an upper and a lower control arm. Other embodiments may include a strut, multi-link, swing arm, trailing arm, and/or other type of independent front suspension.

Independent front suspension 230 allows for a low load floor and for batteries to be disposed in the portion of frame rails 228 between front suspension 230. Such batteries may be disposed at a low height, as no portion of front suspension 230 may be located within frame rails 228 or require raising of frame rails 228 proximate to front suspension 230. Furthermore, the independent configuration of front suspension 230 allows for a passenger vehicle like driving experience, reducing the need for driver training for driving electric commercial vehicle 100 and, thus, increasing the available driver pool and mitigating against potential driver shortages.

Furthermore, such a configuration may allow for the mounting of a plurality of battery packs between front suspension 230. The packs may be at least partially stacked one above another. As the lowest battery pack is mounted low between front suspension 230, it may mitigate the center of gravity effects of the higher mounted pack. Furthermore, the configuration of vehicle architecture 200 may allow for such a stacking arrangement, which may not be possible in a convention architecture with a beam axle suspension. Mounting a plurality of battery packs between front suspension 230 may shift the weight distribution of vehicle 100 forward and such a forward shift in weight distribution may allow for an increase in payload of vehicle 100, which is important for commercial vehicles where payload determines the usefulness of the vehicle. Conversely, for architectures where battery packs are only mounted behind the front axle, the weight distribution of the vehicle may be shifted too far rearward to allow for safe handling with an equivalent payload as that of vehicle architecture 200, requiring a decrease in rated payload.

The various configurations and features of vehicle architecture 200 may be further described herein.

Figure 3:
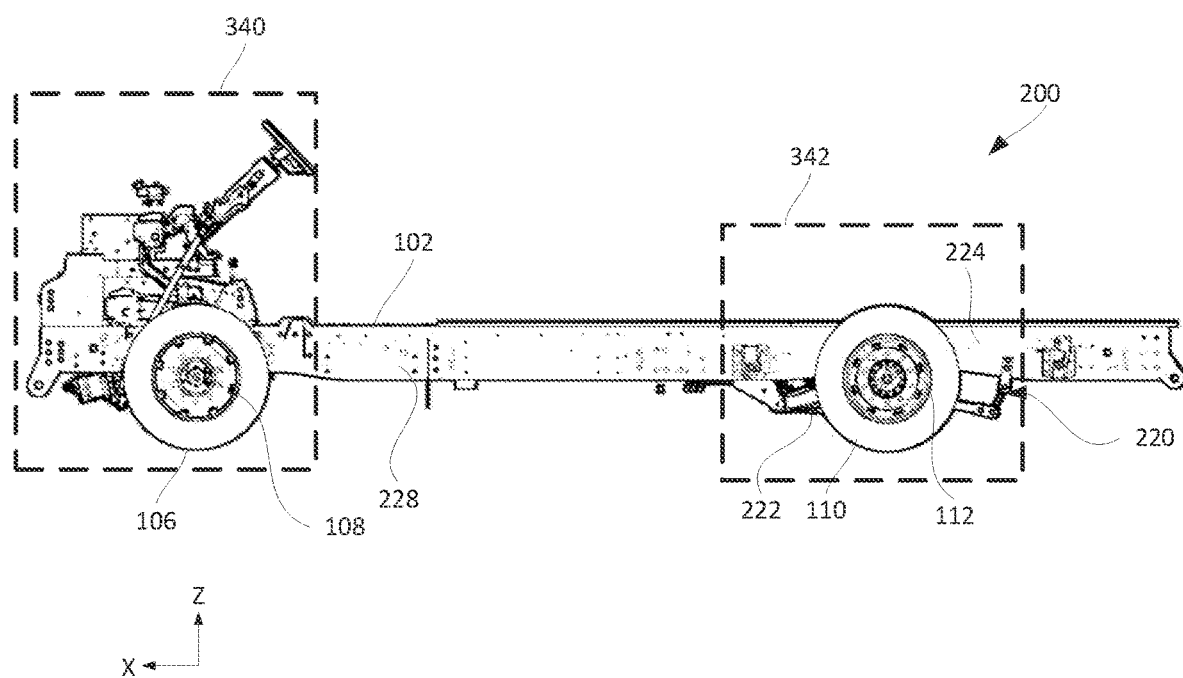
FIG. 3 illustrates a side view an electric commercial vehicle chassis, in accordance with certain embodiments.

FIG. 3 illustrates a side view an electric commercial vehicle chassis, in accordance with certain embodiments. FIG. 3 is a partial side view of vehicle architecture 200. As shown in FIG. 3, vehicle architecture 200 may include front suspension area 340 and rear suspension area 342. In certain embodiments, rear suspension 220 may be disposed within rear suspension area 342 and front suspension 230 (not shown in FIG. 3, but shown in FIG. 2) may be disposed within front suspension area 340.

As described herein, due to the independent configuration of front suspension 230, the portion of frame rails 228 ("first portion" of frame rails 228) within front suspension area 340 may be level or substantially level with that of the majority of frame rails 228 (e.g., the portions that span the majority of the distance between front wheel 108 and rear wheel 112). That is, the bottom of frame rails 228 disposed within front suspension area 340 may be colinear with the majority of other portions of frame rails 228 (e.g., the portions that span the majority of the distance between front wheel 108 and rear wheel 112). Thus, unlike what is required when utilizing a beam axle front suspension, frame rails 228 within front suspension area 340 do not need to be raised.

The portion of frame rails 228 ("second portion" of frame rails 228) within rear suspension area 342 may be notched due to the configuration of the rear suspension 220. As rear suspension 220 includes a beam axle (e.g., de Dion axle 222), chassis 102 (e.g., frame rails 228) are shaped so that movement of the beam axle does not result in contact with that of frame rails 228. Accordingly, the bottom portion of frame rails 228 within rear suspension area 342 is notched to prevent contact with de Dion axle 222. The floor of vehicle 100 utilizing vehicle architecture 200 may, thus, be operated at a lower ride height or include a lower floor height (e.g., due to the lower height of frame rails 228), decreasing cargo lift height. Additionally, notching of frame rails 228 within rear suspension area 342 allows for the CV axles coupled to drivetrain 216 to be operated at a lower vertical misalignment angle or no misalignment angle at all (at a certain load and static ride height), increasing the longevity of the CV axles.

Figure 4:
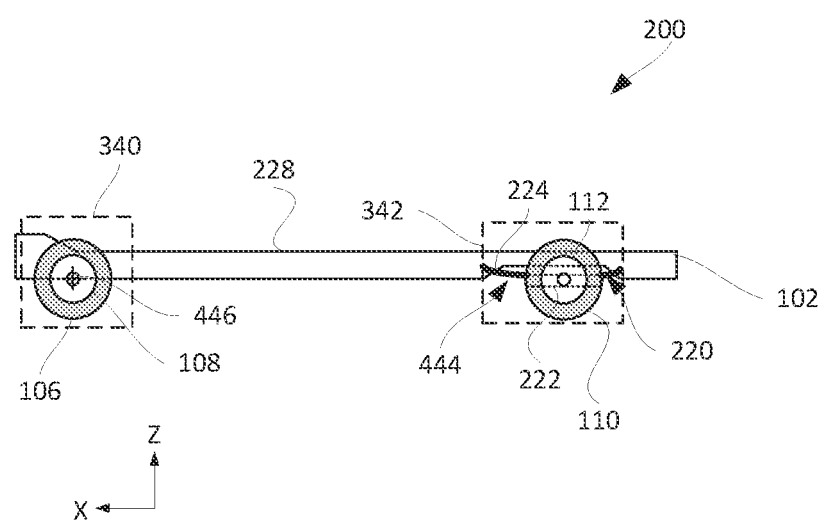
FIG. 4 illustrates a side view of a representation of an electric commercial vehicle chassis, in accordance with certain embodiments.

FIG. 4 illustrates a side view of a representation of an electric commercial vehicle chassis, in accordance with certain embodiments. FIG. 4 further illustrates various features of vehicle architecture 200 described in FIG. 3.

As shown in FIG. 4, at static ride height, front axle centerline 446 of front wheels 108 of vehicle architecture 200 passes through frame rails 228 within front suspension area 340. Such a configuration would not be possible with a beam axle front suspension. As front suspension 230 may be an independent configuration, the portion of frame rails 228 within front suspension area 340 does not need to be raised to allow clearance of a beam axle and, thus, front axle centerline 446 of the front suspension of vehicle architecture 200 may intersect frame rails 228 within front suspension area 340.

Furthermore, as shown in FIG. 4, frame rails 228 within rear suspension area 342 may be notched (e.g., the bottom of frame rails 228 within rear suspension area 342 may be raised upward) to accommodate de Dion axle 222 or another such beam axle (e.g., live or dead axle) of rear suspension 220. During operation of vehicle 100, rear suspension 220 may compress leaf spring 224, leading to upward movement of rear wheel 112 and de Dion axle 222. Notching of frame rails 228 within rear suspension area 342 provides clearance to prevent contact of frame rails 228 with de Dion axle 222.

In certain embodiments, the notched portion of frame rails 228 may be reinforced. That is, for the notched portion of frame rails 228 as well as portions proximate to the notched portion, the material thickness may be increased, material may be multi-layered (e.g., double, triple, or otherwise multi-layered), forms may be used to geometrically strengthen the area (e.g., gussets or tabs), higher strength materials may be used, and/or other such techniques may be utilized to strengthen the notched portions of frame rails 228.

Figure 5:
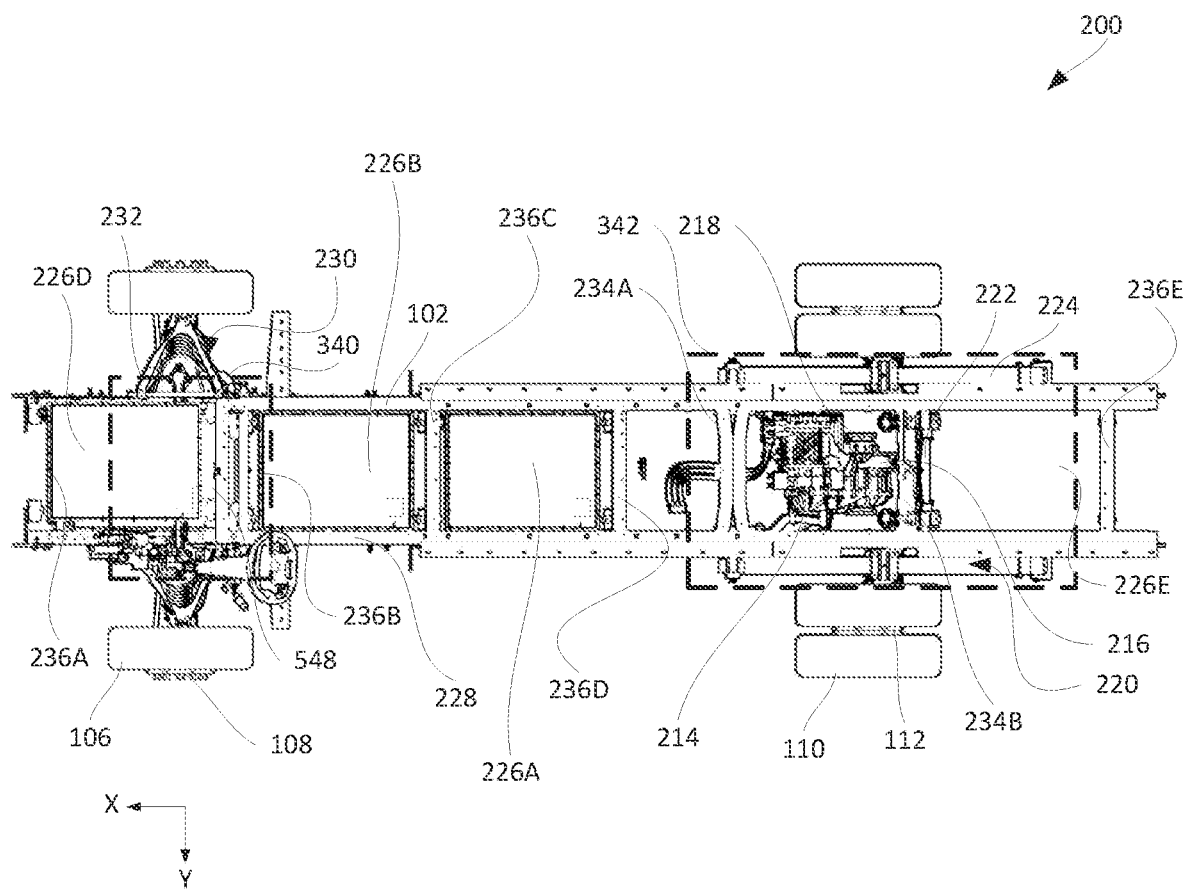
FIG. 5 illustrates a top view of an electric commercial vehicle chassis, in accordance with certain embodiments.

FIG. 5 illustrates a top view representation of an electric commercial vehicle chassis, in accordance with certain embodiments. FIG. 5 illustrates further such strengthening techniques.

Frame rails 228 may include one or more crossmembers, which may provide bending, lateral, torsional, and/or stiffness in other geometries for frame rails 228. In certain embodiments, frame rails 228 may include crossmembers that may provide for bending, lateral, torsional stiffness and/or strengthen frame rails 228 in other manners. Such crossmembers may be coupled to both frame rails (e.g., the left and right frame rails) of chassis 102. Variously, frame rails 228 may include crossmembers 236A-E, which may be sheetmetal formed crossmembers.

As shown in FIG. 5, rear suspension area 342 of frame rails 228 may be notched, as described herein. Rear suspension area 342 of frame rails 228 may be accordingly strengthened. Furthermore, crossmembers 234A and 234B may be disposed within rear suspension area 342. Crossmembers 234A and 234B may be crossmembers of greater strength than that of crossmembers 236A-E. That is, for example, crossmember 234 may be a thicker crossmember that may be formed from a higher strength process (e.g., cast, forged, machined, and/or another such technique) than sheetmetal formed crossmembers. Such higher strength (e.g., higher stiffness) crossmember 234 may further strengthen the area within or proximate to the notched area of frame rails 228. Alternatively or additionally, electric motor 214 and/or drivetrain 216 may be mounted to crossmember 234A and/or 234B, providing for a stiff mounting structure for a drive unit that may generate high torque and, thus, twisting loads on frame rails 228.

Similarly, in certain embodiments, crossmember 548 may be disposed within front suspension area 340. As front suspension area 340 may experience loads from front suspension 230, crossmember 548 may be a stronger crossmember than that of crossmembers 236A-E (e.g., strengthened in a similar manner to that of crossmember 234) to resist such loads.

Furthermore, as illustrated in FIG. 5, battery 226 may include a plurality of battery packs, including battery packs 226A-E. Battery packs 226A and 226B are disposed between the axle centerlines of chassis 102. Battery packs 226C and 226D (not shown in FIG. 5, but shown in FIGS. 6 and 7) are disposed between front suspension 230 at the front of chassis 102. Battery pack 226E is disposed behind the rear axle centerline of chassis 102.

Variously, the positioning of battery packs 226A-E impacts the weight distribution, center of gravity, and payload of vehicle 100. For example, battery packs 226A and 226B are centrally located. Battery packs 226C and 226D are located in the forward portion of chassis 102. The forward location of battery packs 226C and 226D may result in more weight on front wheel 108, which may increase the payload of vehicle 100 as the forward weight may aid in braking and handling when vehicle 100 is fully laden. Conversely, the rearward location of battery pack 226E may result in increased weight on rear wheel 112 and decrease the payload of vehicle 100.

Figure 6:
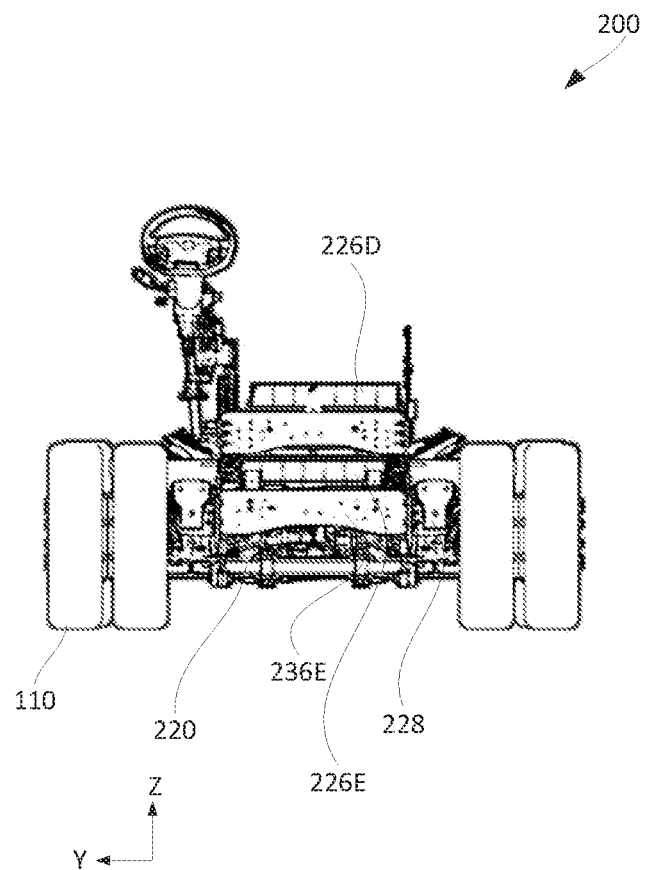
FIG. 6 illustrates a rear view of an electric commercial vehicle chassis, in accordance with certain embodiments.
Figure 7:
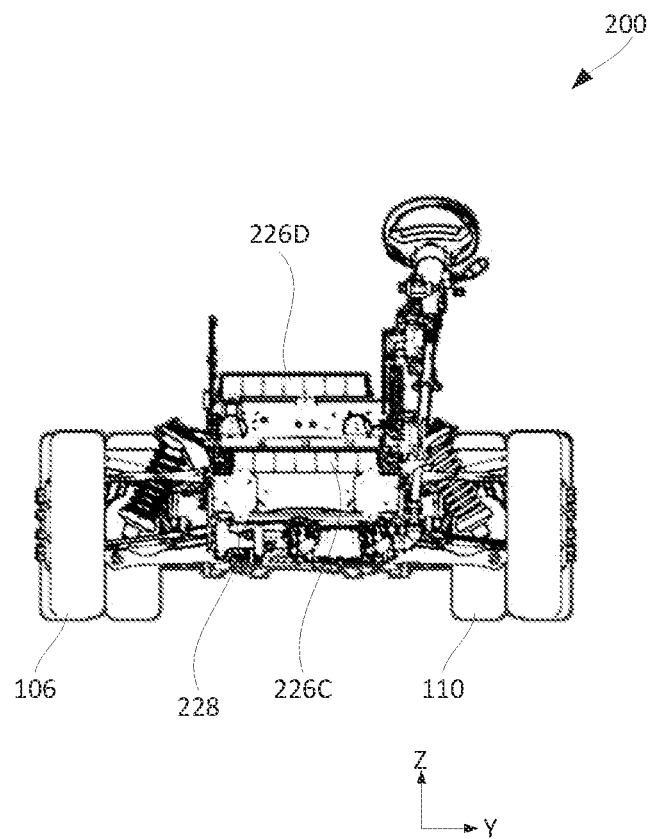
FIG. 7 illustrates a front view of an electric commercial vehicle chassis, in accordance with certain embodiments.

FIG. 6 illustrates a rear view of an electric commercial vehicle chassis, in accordance with certain embodiments. FIG. 7 illustrates a front view of an electric commercial vehicle chassis, in accordance with certain embodiments. As shown in FIG. 6, at least a portion of rear axle 220 may be disposed below frame rails 228 and its attendant crossmembers. Also, as shown in FIGS. 6 and 7, battery packs 226C and 226D may be disposed in the forward portion of chassis 102. Battery pack 226D may be disposed above battery pack 226C, allowing for additional battery storage capacity as well as additional weight on front wheel 108 (e.g., the front axle) of vehicle 100. The stacking of battery pack 226D above battery pack 226C allows for an increase in the front weight of vehicle 100.

Rear Axle Examples

Figure 8:
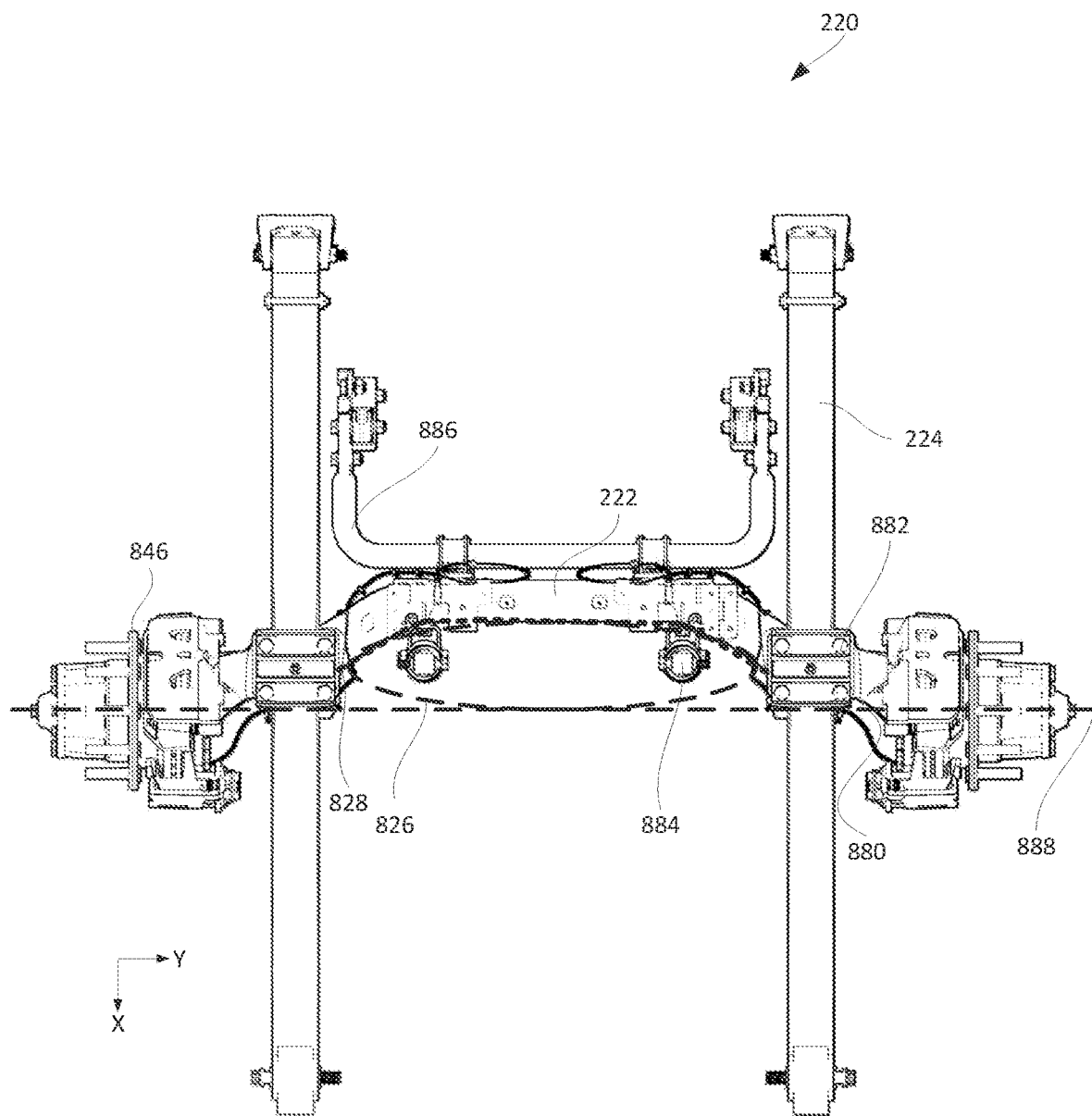
FIG. 8 illustrates a first view an electric commercial vehicle rear axle and suspension, in accordance with certain embodiments.

FIG. 8 illustrates a first view an electric commercial vehicle rear axle and suspension, in accordance with certain embodiments. FIG. 8 illustrates rear axle 220, which includes de Dion axle 222, leaf spring 224, CV cup 880, leaf spring mount 882, damper 884, anti-roll bar 886, and hub assembly 846.

De Dion axle 222 may be a beam axle (e.g., dead axle) that may locate hub assembly 846, which may be disposed on either end of de Dion axle 222. Hub assembly 846 may be hubs coupled to de Dion axle 222 and at least a portion of the hubs may be configured to rotate to allow for wheels coupled to hub assembly 846 to spin. De Dion axle 222 is configured to locate hub assemblies 846 which are coupled on either end (e.g., the left and right end) of de Dion axle 222.

Hub assembly 846 may be powered. De Dion axle 222 does not include a halfshaft for transmitting power; instead, separate CV axles may couple to hub assembly 846 to provide power or motive force to the wheels that are coupled to hub assembly 846. De Dion axle 222 may include CV cup 880, which are shaped to receive CV axles for powering hub assembly 846. CV cup 880 may include features that allow for a CV joint to rotate as necessary. In certain embodiments, de Dion axle 222 may be an axle cast, machined, and/or other formed from a single blank piece of material.

De Dion axle 222 may be curved to allow for the packaging of drive units or drivetrains, as described in FIG. 2. Thus, de Dion axle 222 may include axle curve 828, which may, in certain embodiments, be a rearward (e.g., towards the rear of the vehicle) curve on de Dion axle 222. Other embodiments may, instead, include a forward curve on a de Dion axle. Such a configuration may accommodate a drive unit and/or drivetrain disposed behind de Dion axle 222.

Axle curve 828 of de Dion axle 222 creates area 826, which is an area configured to accommodate at least a portion of an electric motor, drive unit, and/or drivetrain. Thus, for example, a differential, transmission, or transaxle may be disposed within area 826. Area 826 may be rearward of centerline 888 of the wheel/hub assembly 846. Centerline 888 may form the axis of rotation for the wheel/hub. In a typical live axle configuration, the axle is disposed on the axle centerline and, thus, space 826 cannot be used to provide to accommodate an electric motor or an electric drivetrain.

Disposing of the differential, transmission, or transaxle within area 826 allows for a reduction in the misalignment angle of the CV joints of the differential, transmission, or transaxle, as the output of the differential, transmission, or transaxle may be disposed within area 826 and, thus, positioned more in-line with centerline 888 of the wheel and/or hub assembly 846 (e.g., positioned in a straight or straighter line than if the entirety of the differential, transmission, or transaxle needed to be positioned in front of the hub centerline 888.)

Hub assembly 846 may be a hub where at least a portion thereof rotates to rotate a wheel that is coupled to hub assembly 846. In various embodiments, hub assembly 846 may include a hub, brakes, uprights, and/or other such components. Hub assembly 846 may be configured to receive a CV joint that is disposed within CV cup 880.

Leaf spring 224 may provide springing for de Dion axle 222. Leaf spring 224 may be any type of leaf spring. Alternatively or additionally, while the embodiment described in FIG. 8 is shown with a leaf spring, it is appreciated that other embodiments of rear axle 220 may be sprung with another springs, such as torsion bars, coil springs, and/or other such springs.

Leaf spring 224 may be coupled to de Dion axle 222 via leaf spring mount 882. Leaf spring mount 882 may be configured to couple to leaf spring 224 via one or more mechanical fasteners, such as bolts, U-joints, clips, and/or other mechanical techniques, as well as, alternatively or additionally, via adhesives, welds, and/or other such coupling techniques. In various embodiments, leaf spring mount 882 may be disposed off center from centerline 888 of the wheel and/or hub assembly 846 (e.g., forward or rearward, as shown in FIG. 8, of hub centerline 888 of the wheel and/or hub assembly 846), to allow for CV cup 880 to be disposed in a position that reduces the misalignment angle of the CV joint.

Damper 884 may be coupled to de Dion axle 222 to provide for damping of movement the body of the vehicle that rear axle 220 is coupled to. Damper 884 may be any type of damper that may provide damping of movement of a mass. Anti-roll bar 886 may be coupled to de Dion axle 222 and configured to provide resistance against body roll of the vehicle that rear axle 220 is coupled to (e.g., when cornering).

Figure 9:
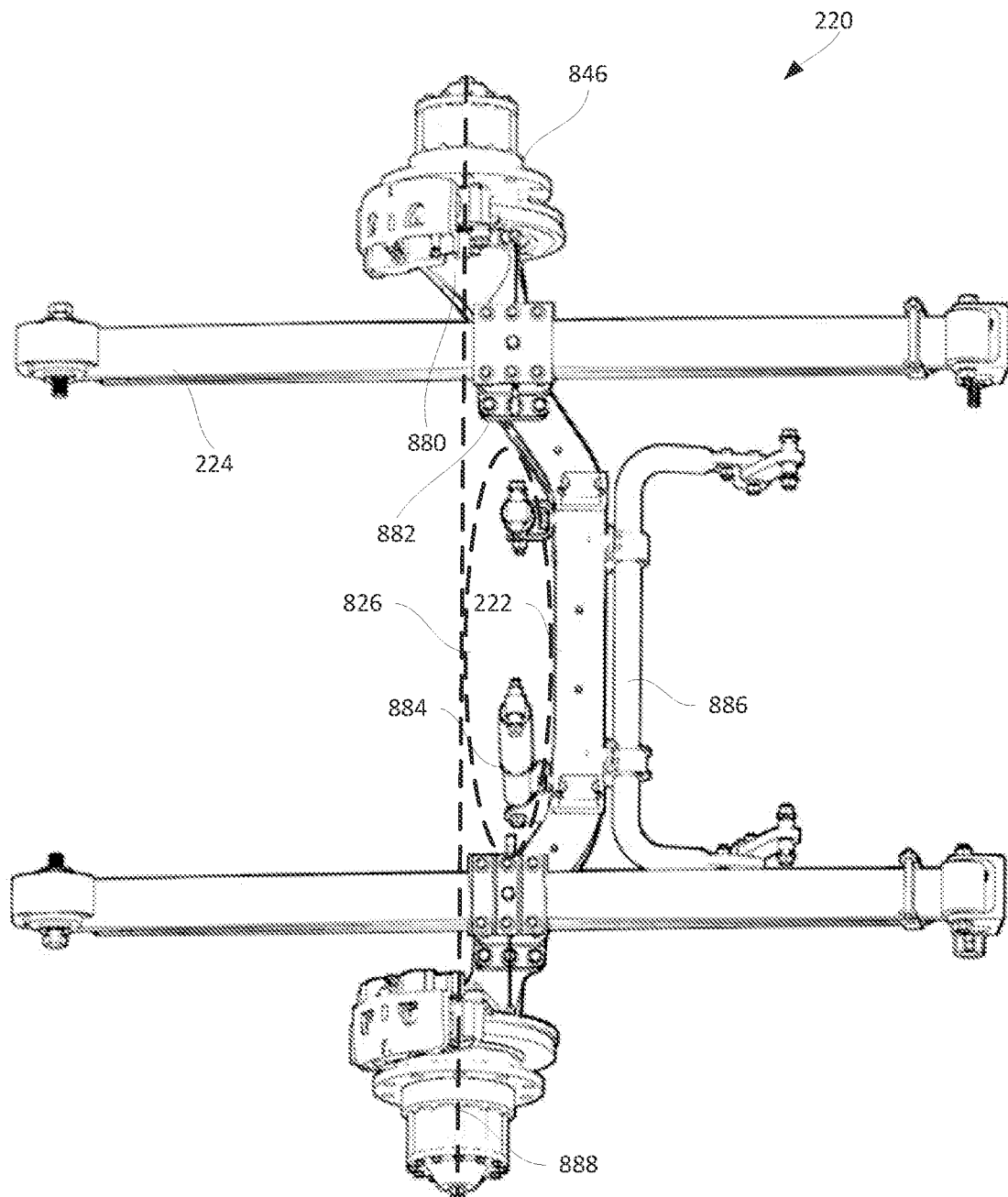
FIG. 9 illustrates a second view an electric commercial vehicle rear axle and suspension, in accordance with certain embodiments.

FIG. 9 illustrates a second view an electric commercial vehicle rear axle and suspension, in accordance with certain embodiments. FIG. 4 illustrates rear axle 220 of FIG. 8, but from a different angle. FIG. 9 further illustrates hub centerline 888, which may be an axis connecting the centerlines of the left and right hub assembly 846 (though the various figures of the disclosure only call out one hub assembly 846, it is appreciated that, for the purposes of the disclosure, hub assembly 846 are present on either end of de Dion axle 222). Area 826 may be disposed rearward of hub centerline 888. Thus, the curvature of de Dion axle 222 allows for area 826, which is extra space that may be utilized for packaging of other systems of the vehicle, such as drive units or drivetrains.

As shown, in FIG. 4 at least a portion of CV cup 880 may intersect hub centerline 888, reducing the misalignment angle of the CV joint that couples to hub assembly 846. Furthermore, as shown in FIG. 4, leaf spring mount 882 may be disposed behind hub centerline 888. Such a configuration allows for CV cup 880 to be located in a position that intersects hub centerline 888. Nonetheless, disposing of leaf spring mount 882 in an area that does not intersect with hub centerline 888 may introduce a torque on the vehicle when a bump is experienced by rear axle 220, requiring corresponding suspension kinetic design to counteract, such as through the inclusion of anti-roll bar 886.

Figure 10:
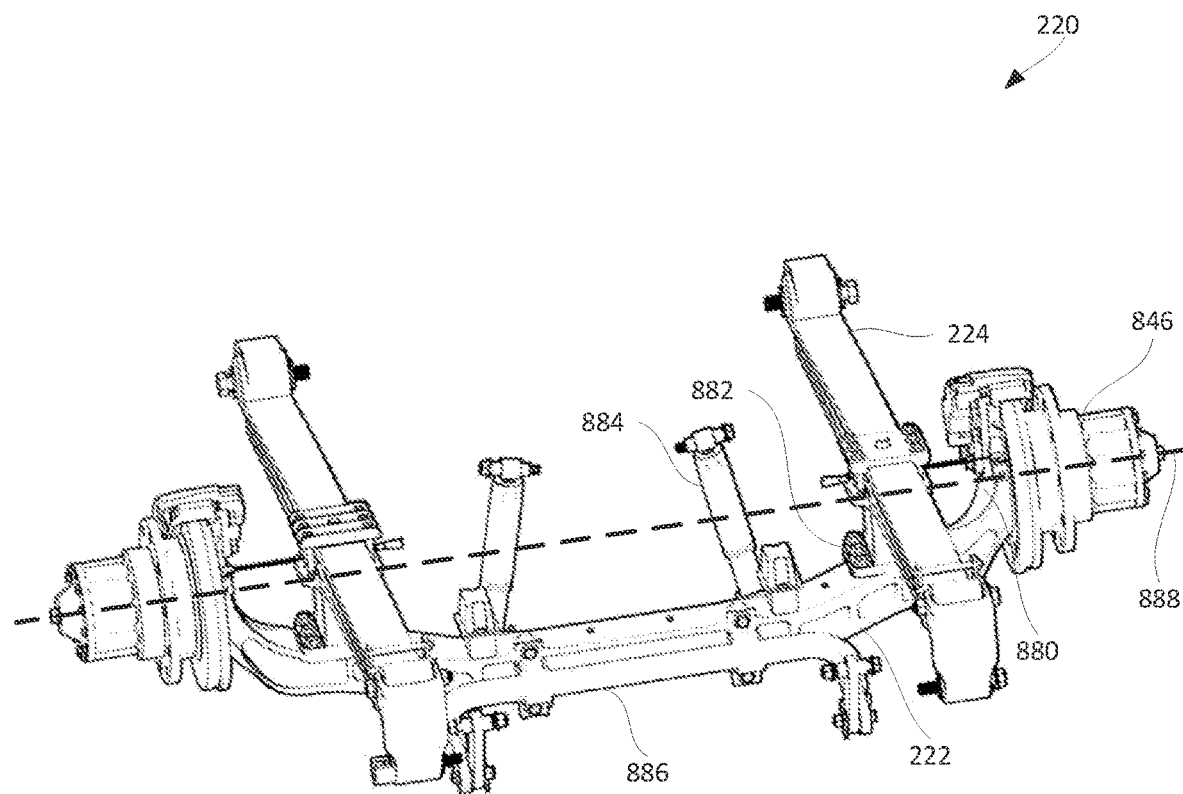
FIG. 10 illustrates a third view an electric commercial vehicle rear axle and suspension, in accordance with certain embodiments.

FIG. 10 illustrates a third view an electric commercial vehicle rear axle and suspension, in accordance with certain embodiments. FIG. 10 illustrates rear axle 220 of FIGS. 8 and 9, but from a further angle. FIG. 10 illustrates that de Dion axle 222 curves rearward (e.g., towards the rear of the vehicle) and also downward (e.g., towards the road surface when installed on a vehicle). Thus, leaf spring mount 882 may be disposed below that of hub centerline 888. Leaf spring 224 may accordingly be mounted below that of hub centerline 888. The downward curvature of de Dion axle 222 allows for a lower leaf spring mount 882 and, thus, lower positioning of leaf spring 224.

Figure 11:
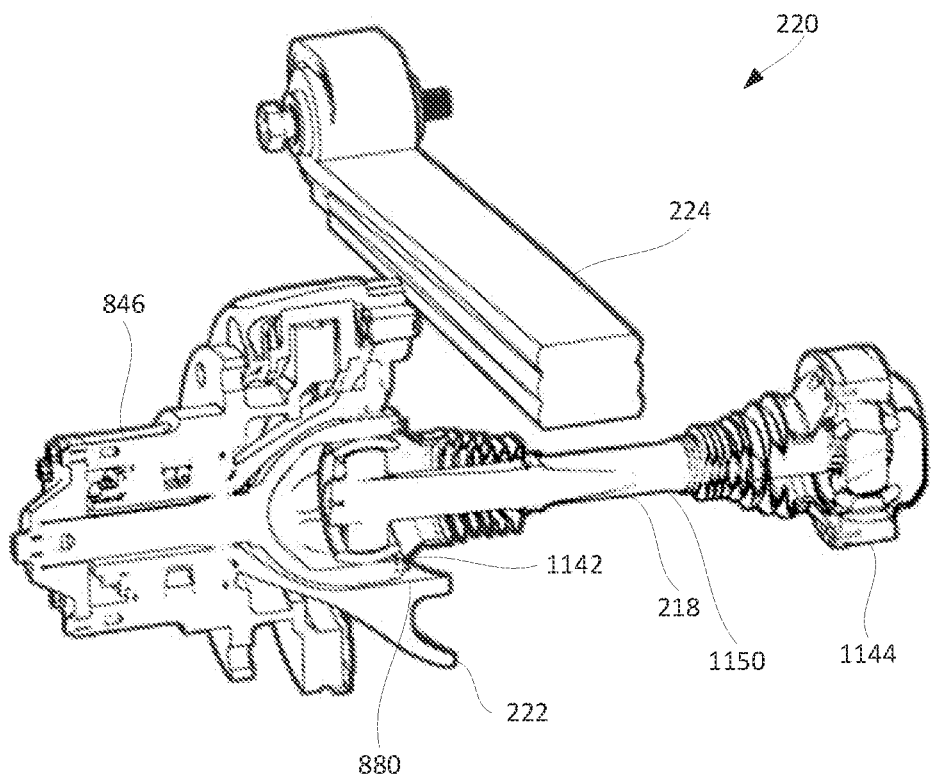
FIG. 11 is a cutaway view of an electric commercial vehicle rear axle and suspension, in accordance with certain embodiments.

FIG. 11 is a cutaway view of an electric commercial vehicle rear axle and suspension, in accordance with certain embodiments. FIG. 11 illustrates portions of rear axle 220 including de Dion axle 222, leaf spring 224, hub assembly 846, and CV axle 218. CV axle 218 includes outer CV joint 1142 and inner CV joint 1144.

As shown in FIG. 11, de Dion axle 222 includes CV cup 880 configured to receive outer CV joint 1142. CV cup 880 may be configured to receive outer CV joint 1142. Outer CV joint 1142 and inner CV joint 1144 may be configured to rotate and operate at an angle relative to halfshaft 1150 of CV axle 218. Outer CV joint 1142 may be configured to couple to a portion of hub assembly 846 and rotate the portion thereof.

Thus, as described herein, de Dion axle 222 may be disposed around outer CV joint 1142 and is configured to support the full weight of the vehicle. Hub assembly 846 may be coupled to de Dion axle 222 and forces from hub assembly 846 may be transmitted to de Dion axle 222. Accordingly, the configuration of rear axle 220 including de Dion axle 222 allows for a full floating de Dion axle 222 with attendant higher weight carrying capacity, while utilizing outer CV joint 1142 to interface with the hub of hub assembly 846 and, thus, prevent wheel decoupling in the event of a halfshaft failure, which would occur with a traditional live axle configuration.

Figure 12:
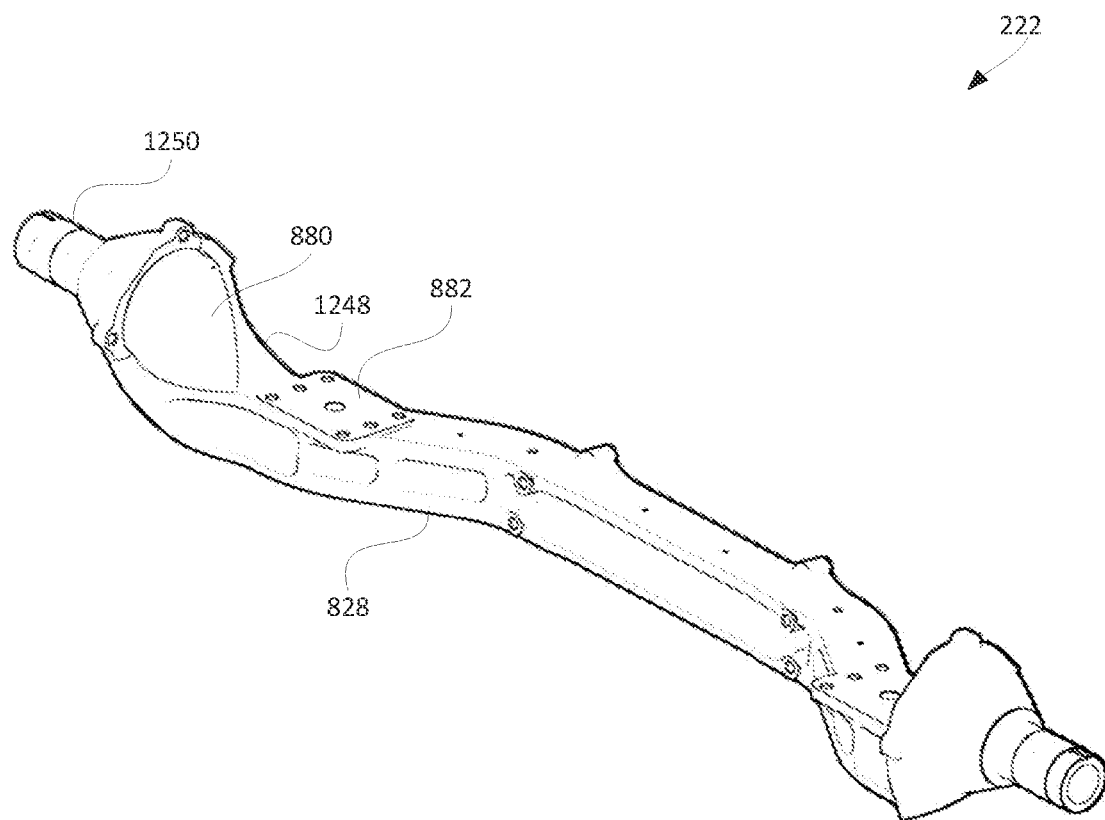
FIG. 12 is a perspective view of a rear axle, in accordance with certain embodiments.

FIG. 12 is a perspective view of a rear axle, in accordance with certain embodiments. FIG. 12 illustrates de Dion axle 222, which may be a monolithic part that is cast, machined, and/or otherwise formed as a single part. As shown in FIG. 12, de Dion axle 222 includes a downward and/or rearward axle curve 828, as well as CV cup 880, leaf spring mount 882, and stub axle 1250.

CV to spring mount portion 1248 of de Dion axle 222 may curve downward and, thus, leaf spring mount 882 may be disposed below the centerline formed by the stud axles disposed on either side of de Dion axle 222. Stub axle 1250 may be configured to interface with hub assemblies (e.g., hub assembly 846) and allow for the hub assembly to spin relative to stub axle 1250.

Figure 13:
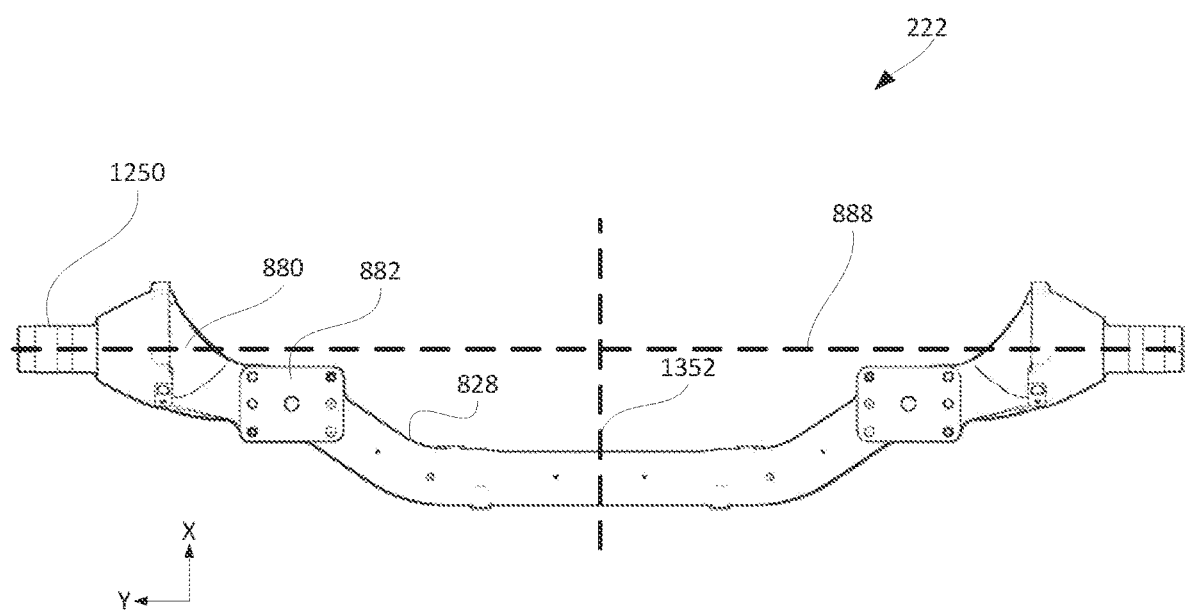
FIG. 13 is a top view of a rear axle, in accordance with certain embodiments.

FIG. 13 is a top view of a rear axle, in accordance with certain embodiments. FIG. 13 illustrates de Dion axle 222 with axle centerline 1352 and hub centerline 888. In various embodiments, hub centerline 888 may define an axis of rotation of stub axle 1250. That is, stub axle 1250 may accommodate a hub and, thus, a wheel, and the hub/wheel may rotated around stub axle 1250 when coupled to stub axle 1250.

As shown in FIG. 8, de Dion axle 222 is symmetrical around axle centerline 1352. Other embodiments of de Dion axle 222 may not be symmetrical around axle centerline 1352. Furthermore, as shown in FIG. 13, CV cup 880 of de Dion axle 222 may be shaped so that CV cup 880 disposes the centerline of the respective CV joint (e.g., the axis of rotation of the outward portion of the outer CV joint) to be co-linear with hub centerline 888. Additionally, as shown in FIG. 13, leaf spring mount 882 is disposed fully behind hub centerline 888 and no portion of leaf spring mount 882 intersects hub centerline 888.

Figure 14:
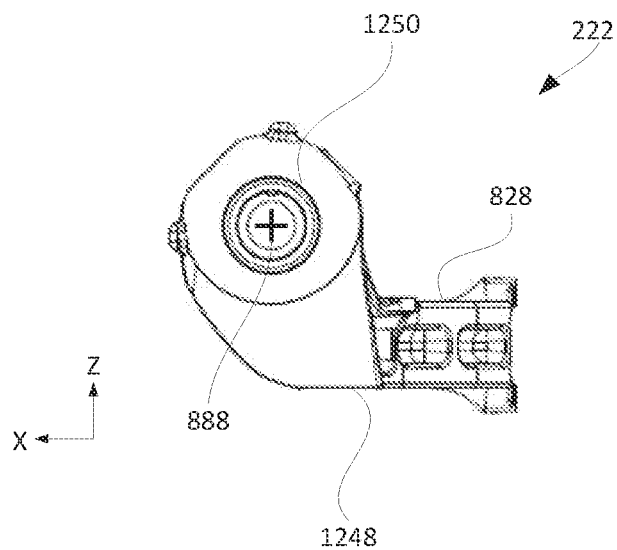
FIG. 14 is a side view of a rear axle, in accordance with certain embodiments.

FIG. 14 is a side view of a rear axle, in accordance with certain embodiments. FIG. 14 illustrates de Dion axle 222 with hub centerline 888. As clearly shown in the side view of FIG. 14, hub centerline 888 as well as the entirety of stub axle 1250 is disposed above the portion of de Dion axle 222 that includes axle curve 828. Furthermore, as shown in FIG. 9, CV to spring mount portion 1248 transitions downward from the portion of de Dion axle 222 that includes stub axle 1250 (and CV cup 880 shown elsewhere) to the portion of de Dion axle 222 that includes axle curve 828. The downward curve of de Dion axle 222 allows for a lower load floor and/or for frame rails of the chassis to be disposed lower, increasing load volume capacity, ease of use, and/or chassis strength.

Figure 15:
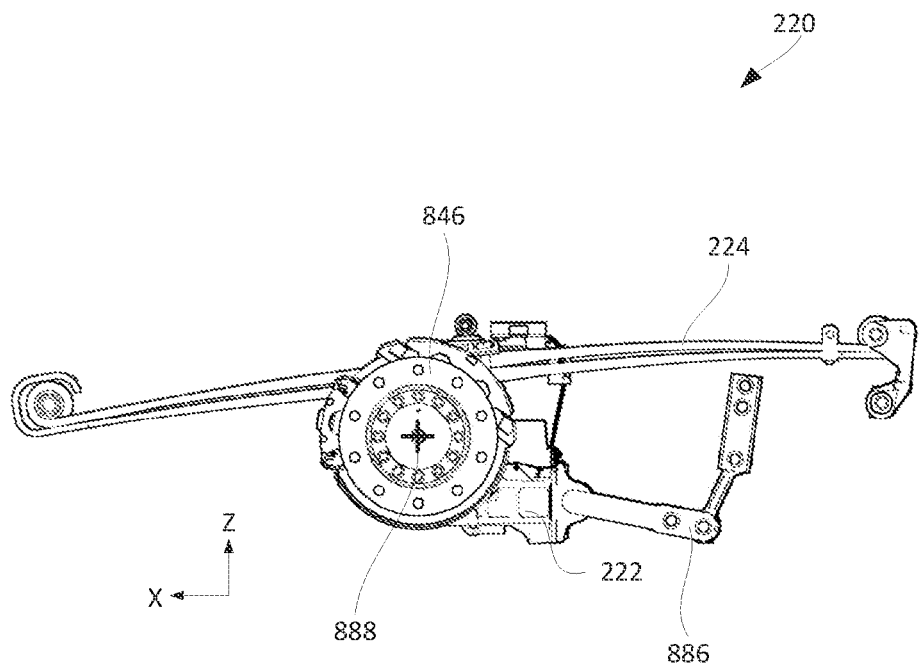
FIG. 15 is a side view of an electric commercial vehicle rear axle and suspension, in accordance with certain embodiments.

FIG. 15 is a side view of an electric commercial vehicle rear axle and suspension, in accordance with certain embodiments. FIG. 15 illustrates rear suspension 220 including leaf spring 224, hub assembly 846, de Dion axle 222, and anti-roll bar 886. As shown in FIG. 15, anti-roll bar 886 is coupled to de Dion axle 222 below hub centerline 888 while leaf spring 224 is disposed above hub centerline 888. As leaf spring 224 is coupled to the side of frame rails 228, the shackles of leaf spring 224 do not hang below frame rails 228 and can, thus, be disposed above de Dion axle 222.

Figure 16:
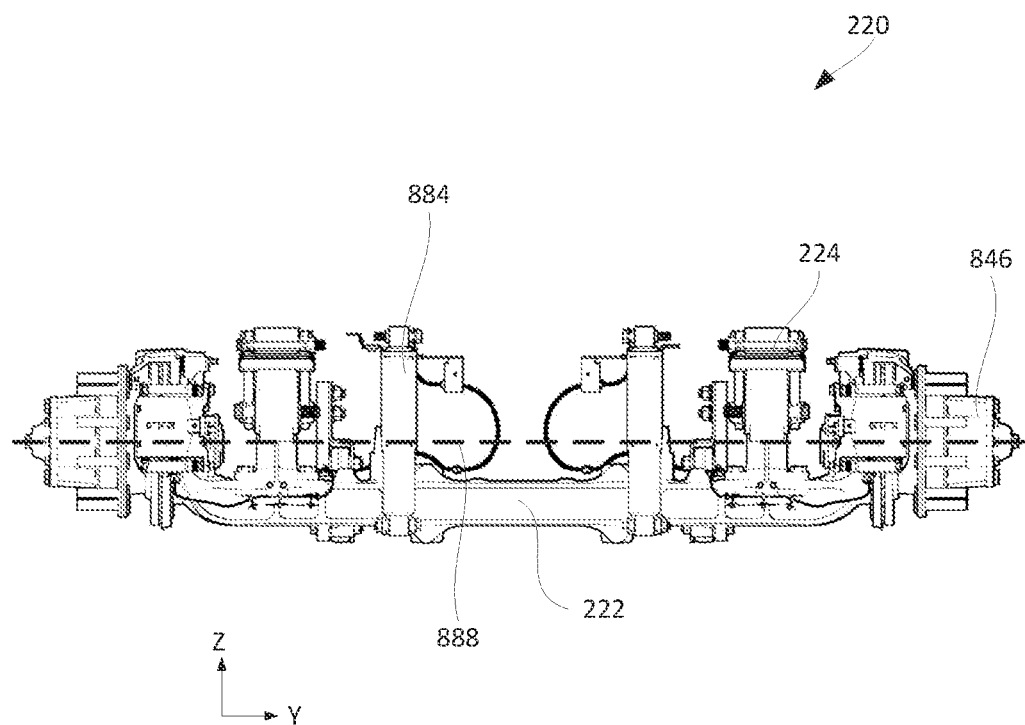
FIG. 16 is a rear view of an electric commercial vehicle rear axle and suspension, in accordance with certain embodiments.

FIG. 16 is a rear view of an electric commercial vehicle rear axle and suspension, in accordance with certain embodiments. FIG. 16 illustrates rear suspension 220 including leaf spring 224, hub assembly 846, dampers 884, and de Dion axle 222. As shown in FIG. 16, the central portion of de Dion axle 222 curves downward below hub centerline 888. Damper 884 couples to de Dion axle 222 below hub centerline 888.

Manufacturing and Operation Examples

Figure 17:
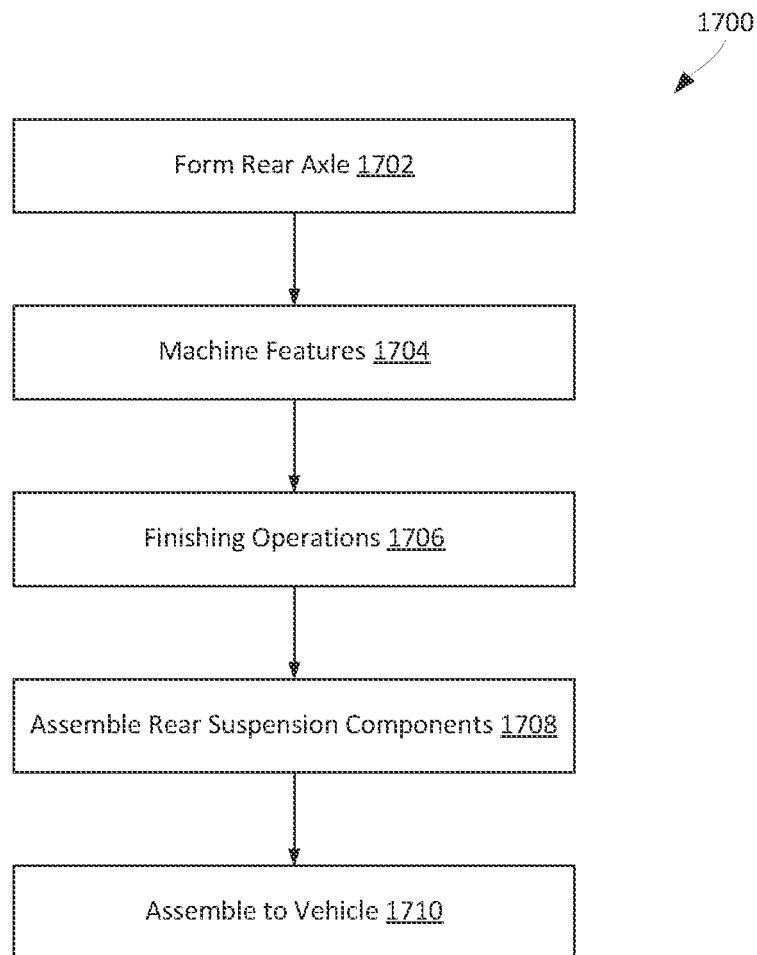
FIG. 17 is a flow chart illustrating a technique of manufacturing a rear axle for an electric commercial vehicle, in accordance with certain embodiments.

FIG. 17 is a flow chart illustrating a technique of manufacturing a rear axle for an electric commercial vehicle, in accordance with certain embodiments. Technique 1700 of FIG. 17 illustrates a technique of forming and assembly the rear axle described herein.

In 1702, the rear axle may be formed (e.g., forged, cast, billet machined, or otherwise formed in any other technique). Thus, the rear axle may be made from any forgeable or castable metal, such as aluminum or iron. In other embodiments, the rear axle may be machined from a blank, formed from composites, and/or manufactured through another technique.

In 1704, various features of the rear axle may be machined (e.g., after forging, casting, and/or from a blank). Such features may include, for example, the CV cups, the leaf spring mounts, bolt holes, and/or other features of the rear axle. After the machining of such features, finishing operations may be performed in 1706 to, for example, clean up flash and/or cosmetically finish the rear axle.

Rear suspension components may then be assembled in 1708 to the rear axle. Such components may include, for example, springs, dampers, anti-roll bars, hubs, brakes, and/or other such components. The completed rear suspension may then be assembled to the vehicle in 1717.

Figure 18:
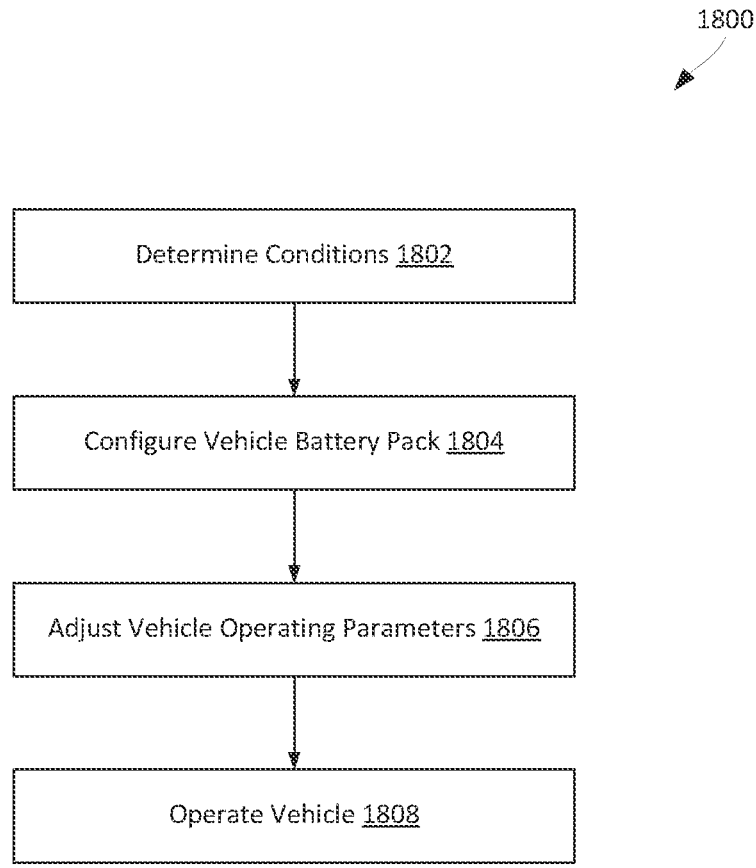
FIG. 18 is a flow chart illustrating a technique of operating a electric commercial vehicle, in accordance with certain embodiments.

FIG. 18 is a flow chart illustrating a technique of operating a electric commercial vehicle, in accordance with certain embodiments. Technique 1800 of FIG. 18 illustrates a technique of operating an electric commercial vehicle described herein. Variously, the electric commercial vehicle (e.g., vehicle 100) described herein may include a plurality of battery packs disposed between the frame rails of the vehicle. One or more such battery packs may be removable. Adding additional battery packs to the vehicle may increase the range, but decrease the available payload, while removing battery packs may increase the payload, but decrease the range. Technique 1800 describes a technique for adjusting the operating parameters of the vehicle.

In 1802, operating conditions for the vehicle may be determined. The operating conditions may include, for example, the range required before recharge, the operating speed, the terrain, the environmental conditions (e.g., weather and temperature), the traffic conditions, the amount of stops, and/or other such parameters.

Based on the operating conditions, the vehicle battery pack configuration is determined in 1804. Thus, for example, the operating conditions may indicate that a range needed for the electric commercial vehicle. As battery packs are of considerable weight, incorporating additional unneeded battery packs within the vehicle may lead to a decrease in payload. Thus, for example, if weather conditions indicate low operating temperatures, the amount of battery packs carried by the electric commercial vehicle may be increased to compensate for decreased electrical range of each individual pack due to low ambient temperatures. By contrast, if weather conditions indicate high operating temperatures, the amount of battery packs carried by the electric commercial vehicle may be decreased to increase payload in light of the increased available range from each individual pack.

Thus, in 1804, the determination may result in a configuration of the vehicle with a limited amount of battery packs matching the needed range before recharge, with a buffer. Furthermore, the determination may also indicate, if certain packs are to be added, the location that the packs would be mounted to or, if certain packs are to be removed, the packs that should be removed. For example, if battery packs are to be removed, battery packs disposed behind the rear axle may be removed first, as removal of those packs may increase the payload of the vehicle by the greatest amount as decreasing rear weight may be most beneficial for handling and braking.

Based on the battery pack configuration of 1804, vehicle operating parameters may be adjusted in 1806. Adjustment of the vehicle operating parameters may include, for example, adjustment of the payload rating of the electric commercial vehicle, adjustment of the motor operating algorithms based on the changed battery capacity, adjustment of the rated range, adjustment of vehicle control algorithms, and/or other such operating parameter adjustments.

Based on such adjustments, the electric commercial vehicle may be operated in 1808.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. An electric commercial vehicle comprising:
a ladder frame comprising a plurality of frame rails;
an electric motor, disposed between at least two of the frame rails and mounted to the ladder frame;
a drivetrain, coupled to the electric motor and configured to transmit motive force from the electric motor;
a battery, comprising one or more battery packs configured to provide electrical power to the electric motor, each battery pack disposed between at least two of the frame rails;
a CV axle, configured to transmit motive force from the drivetrain;
an independent front suspension, wherein the front suspension is disposed proximate a front suspension area of the ladder frame, wherein a first portion of the ladder frame is within the front suspension area and a second portion of the ladder frame is outside the front suspension area, and wherein a bottom of the first portion of the ladder frame within the front suspension area is colinear with one of the plurality of frame rails of the second portion of the ladder frame; and
a rear suspension comprising a beam axle, the rear suspension coupled to the CV axle.

2. The electric commercial vehicle of claim 1, wherein the beam axle is a dead axle.

3. The electric commercial vehicle of claim 2, wherein the beam axle is a de Dion axle.

4. The electric commercial vehicle of claim 3, further comprising:
   a hub assembly, coupled to an end of the beam axle and comprising a hub, the hub configured to rotate around a hub centerline.

5. The electric commercial vehicle of claim 4, wherein a center portion of the de Dion axle is disposed rearward and downward of the hub centerline.

6. The electric commercial vehicle of claim 4, wherein the hub centerline intersects at least a portion of the drivetrain.

7. The electric commercial vehicle of claim 2, wherein the beam axle comprises a CV cup configured to receive a portion of the CV axle.

8. The electric commercial vehicle of claim 1, wherein the drivetrain is a transaxle.

9. The electric commercial vehicle of claim 1, wherein the rear suspension is disposed within a rear suspension area of the ladder frame, and wherein the plurality of frame rails is notched within the rear suspension area.

10. The electric commercial vehicle of claim 9, wherein the notching prevents contact between the plurality of frame rails and the beam axle.

11. The electric commercial vehicle of claim 9, wherein each of the plurality of frame rails is strengthened within the rear suspension area.

12. The electric commercial vehicle of claim 11, wherein the strengthening comprises one or more of an increase in a thickness of material, multiple layers of material, and/or strength increasing forms.

13. The electric commercial vehicle of claim 1, wherein at least one battery pack is at least partially disposed between the at least two of the frame rails within the front suspension area.

14. The electric commercial vehicle of claim 1, wherein a plurality of battery packs are at least partially disposed between the at least two of the frame rails within the front suspension area.

15. The electric commercial vehicle of claim 14, wherein at least two of the plurality of battery packs are stacked atop each other.

16. The electric commercial vehicle of claim 1 wherein a front axle centerline of the independent front suspension passes through the first portion of the ladder frame.

17. The electric commercial vehicle of claim 1, wherein the drivetrain is mounted to the ladder frame.

18. The electric commercial vehicle of claim 1, further comprising:
   a wheel, wherein the CV axle is configured to transmit the motive force from the drivetrain to the wheel.

* * * * *